US 6,675,171 B2

(12) United States Patent
Tikkanen et al.

(10) Patent No.: US 6,675,171 B2
(45) Date of Patent: Jan. 6, 2004

(54) MEMORY BASED ON A DIGITAL TRIE STRUCTURE

(75) Inventors: Matti Tikkanen, Espoo (FI); Jukka-Pekka Iivonen, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

(21) Appl. No.: 09/997,769

(22) Filed: Nov. 29, 2001

(65) Prior Publication Data

US 2002/0040361 A1 Apr. 4, 2002

Related U.S. Application Data

(63) Continuation of application No. PCT/FI00/00381, filed on Apr. 28, 2000.

(30) Foreign Application Priority Data

Jun. 2, 1999 (FI) .................................................. 991262

(51) Int. Cl.[7] .............................................. G06F 17/30
(52) U.S. Cl. ...................... 707/101; 707/100; 707/205
(58) Field of Search ................................ 707/100, 101, 707/205

(56) References Cited

U.S. PATENT DOCUMENTS

| | | | | |
|---|---|---|---|---|
| 5,276,868 A | * | 1/1994 | Poole .............................. | 707/3 |
| 5,592,667 A | | 1/1997 | Bugajski ....................... | 707/102 |
| 5,721,899 A | | 2/1998 | Namba ........................... | 707/3 |
| 5,778,371 A | * | 7/1998 | Fujihara ....................... | 707/100 |
| 5,787,430 A | * | 7/1998 | Doeringer et al. ............ | 707/100 |
| 5,829,004 A | * | 10/1998 | Au ................................ | 707/100 |
| 5,848,416 A | * | 12/1998 | Tikkanen ..................... | 707/101 |
| 5,995,971 A | * | 11/1999 | Douceur et al. .............. | 707/102 |
| 6,115,716 A | * | 9/2000 | Tikkanen et al. ............ | 707/100 |
| 6,499,032 B1 | * | 12/2002 | Tikkanen et al. ............ | 707/101 |
| 6,505,206 B1 | * | 1/2003 | Tikkanen et al. ............ | 707/101 |

FOREIGN PATENT DOCUMENTS

| | | |
|---|---|---|
| EP | 0408188 | 6/1990 |
| FI | 991262 | 3/2000 |
| WO | WO 98/41932 | 2/1998 |
| WO | WO 98/41933 | 3/1998 |

OTHER PUBLICATIONS

Al–suwaiyel et al., Algorithms for Trie Compaction, ACM transactions on Database System, vol.9, No.2, Jun. 1984, pp. 243–26.*
Walter A. Burkhard, Associative Retrieval Trie Hash–Coding, Proceedings of the 8th Annual ACM Symposium on Theory of Computing, May 1976, pp. 211–219.*
W.A.Burkhard, Hashing and Trie Algorithms for Partial Match, ACM Transactions on Database Systems, vol.1, No.2, Jun. 1976 pp. 175–187.*

* cited by examiner

*Primary Examiner*—Greta Robinson
(74) *Attorney, Agent, or Firm*—Squire, Sanders & Dempsey L.L.P.

(57) ABSTRACT

Disclosed herein is a method for implementing a memory and a memory arrangement. The memory is implemented as a directory structure including a tree-shaped hierarchy having nodes at several different hierarchy levels. The directory structure employs width-compressed nodes in which, non-nil pointers and a bit pattern having one bit for each element, are physically stored. The physical storage location in the node is determined on the basis of the bit pattern. A search table is provided in which numbers of bits having the value 1 are stored in different combinations of a word whose total number of bits is a predetermined portion of the number of bits in the bit pattern.

8 Claims, 3 Drawing Sheets

FIG.5   0 1 2 3 ④ 5 6 7 8 9 10 11 12 13 14 15 ← INDEX
        0 1 0 1 1 1 0 0 1 1 1 0 1 0 1 0 ← BIT PATTERN
                                    ↑
                              BIT PATTERN BP1

BIT PATTERN BP2
FIG.6   0 1 0 1 1 : 0 0 0 0 0 0 0 0 0 0 0

TABLE T1

INDEX →

FIG.9   0 1 2 3 4 5 6 7 8 9 ⑩ 11 12 13 14 15 ← INDEX
        0 1 0 1 1 1 0 0 1 1 1 0 1 0 1 0 ← BIT PATTERN

MASKED
                                      BIT
FIG.10  0 1 0 1 1 1 0 0 1 1 1 : 0 0 0 0 0 ← PATTERN

MEMORY BASED ON A DIGITAL TRIE STRUCTURE

This is a continuation of application No. PCT/FI00/00381 filed Apr. 28, 2000.

FIELD OF THE INVENTION

The present invention generally relates to implementation of a memory. More specifically, the invention is intended to be used in connection with memories which are based on a digital trie structure and in which width-compressed nodes are used. The solution is mainly intended for central memory databases and is suited for both conventional overwriting memories and functional memories. The former denotes a memory in which updates are made directly on the existing data and the latter, on the other hand, a memory in which the path from the root of the structure to the point of addition is first copied, and the addition is thereafter made to the copied data (the addition is not made directly to the existing data). The former updating procedure is also called by the term "update-in-place" and the latter by the term "copy-on-write".

BACKGROUND OF THE INVENTION

The prior art unidimensional directory structure termed digital trie (the word "trie" is derived from the English word "retrieval") is the underlying basis of the principle of the present invention. Digital trie structures can be implemented in two types: bucket tries, and tries having no buckets.

A bucket digital trie structure is a tree-shaped structure composed of two types of nodes: buckets and trie nodes. A bucket is a data structure that can accommodate a number of data units or a number of pointers to data units or a number of search key/data unit pairs or a number of search key/pointer pairs. A maximum size greater than one has been defined for said number. However, a bucket can contain a smaller number than said maximum number of data units, pointers, or key/pointer pairs, in which case the bucket is not full. A trie node, on the other hand, is an array guiding the retrieval, having a size of two by the power of k ($2^k$) elements. If an element in a trie node is in use, it refers either to a trie node at the next level in the directory tree or to a bucket. In other cases, the element is free (empty).

Search in the database proceeds by examining the search key (which in the case of a subscriber database in a mobile telephone network or a telephone exchange, for instance, is typically the binary numeral corresponding to the telephone number of the subscriber) k bits at a time. The bits to be searched are selected in such a way that at the root level of the structure (in the first trie node), k leftmost bits are searched; at the second level of the structure, k bits next to the leftmost bits are searched, etc. The bits to be searched are interpreted as an unsigned binary integer that is employed directly to index the element table contained in the trie node, the index indicating a given element in the table. If the element indicated by the index is free, the search will terminate as unsuccessful. If the element refers to a trie node at the next level, k next bits extracted from the search key are searched at that level in the manner described above. As a result of comparison, the routine branches off in the trie node either to a trie node at the next level or to a bucket. If the element refers to a bucket containing a key, the key stored therein is compared with the search key. The entire search key is thus compared only after the search has encountered a bucket. Where the keys are equal, the search is successful, and the desired data unit is obtained at the storage address indicated by the pointer of the bucket. Where the keys differ, the search terminates as unsuccessful.

A bucketless trie structure has no buckets, but a leaf node containing only one element that can be a data unit, a pointer to a data unit, a search key/data unit pair or a search key/pointer pair corresponds to a bucket. In the present context, the nodes above the leaf nodes in the bucketless trie structure are called internal nodes; these correspond to trie nodes in a bucket structure (i.e., they comprise a similar table as trie nodes). In a bucketless digital trie structure, the nodes are thus either internal nodes or leaf nodes. By means of buckets, the need for reorganizing the directory structure can be postponed, as a large number of pointers, data units, search key/data unit pairs or search key/pointer pairs can be accommodated in the buckets until a time when such a need arises.

FIG. 1 shows an example of a digital trie structure in which the key has a length of 4 bits and k=2, and thus each trie node has $2^2=4$ elements, and two bits extracted from the key are searched at each level. Leaves are denoted with references A, B, C, D . . . H . . . M, N, O and P. Thus a leaf is a node that does not point to a lower level in the tree. Internal nodes are denoted with references IN1 . . . IN5 and elements in the internal node with reference NE in FIG. 1.

In the exemplary case of FIG. 1, the search keys for the leaves shown are as follows: A=0000, B=0001, C=0010, . . . , H=0111, . . . and P=1111. In this case, a pointer is stored in each bucket to that storage location in the database SD at which the actual data, e.g. the telephone number of the pertinent subscriber and other information relating to that subscriber, is to be found. The actual subscriber data may be stored in the database for instance as a sequential file of the type shown in the figure. The search is performed on the basis of the search key of record H, for example, by first extracting from the search key the two leftmost bits (01) and interpreting them, which delivers the second element of node IN1, containing a pointer to node IN3 at the next level. At this level, the two next bits (11) are extracted from the search key, thus yielding the fourth element of that node, pointing to record H.

Instead of a pointer, a leaf may contain (besides a search key) an actual data file (also called by the more generic term data unit). Thus for example the data relating to subscriber A (FIG. 1) may be located in leaf A, the data relating to subscriber B in leaf B, etc.

The search key may also be multidimensional. In other words, the search key may comprise a number of attributes (for example the family name and one or more forenames of a subscriber). Such a multidimensional trie structure is disclosed in international application No. PCT/FI95/00319 (published under number WO 95/34155). In said structure, address computation is performed in such a way that a given predetermined number of bits at a time is selected from each dimension independently of the other dimensions. Hence, a fixed limit independent of the other dimensions is set for each dimension in any individual node of the trie structure, by predetermining the number of search key bits to be searched in each dimension. With such a structure, the memory circuit requirement can be curbed when the distribution of the values of the search keys is known in advance, in which case the structure can be implemented in a static form.

If the possibility of reorganizing the structure in accordance with the current key distribution to be optimal in terms of efficiency and storage space occupancy is desired, the size of the nodes must vary dynamically as the key distribution changes. When the key distribution is even, the node size may be increased to make the structure flatter (a flatter structure entails faster retrievals). On the other hand, with uneven key distributions in connection with which storage space occupancy will present a problem in memory structures employing dynamic node size, the node size can be maintained small, which will enable locally a more even key distribution and thereby smaller storage space occupancy. Dynamic changes of node size require the address computation to be implemented in such a way that in each node of the tree-shaped hierarchy constituted by the digital trie structure, a node-specific number of bits is selected from the bit string constituted by the search keys used. Dynamic reorganizing of the nodes naturally requires part of the processing capacity.

The choice between a fixed node size and a dynamically changing node size is dependent for example on what type of application the memory is intended for, e.g. what the number of database searches, additions and deletions is and what the proportions of said operations are.

The efficiency and performance of the memory are thus influenced, among other things, by the storage space required by the trie structure and the depth of the trie structure. Both of these can be influenced by performing width compression in the nodes. Width compression means that the size (width) of the node is diminished by physically storing in the node only those pointers whose value deviates from zero. This will be described in brief in the following.

FIG. 2 illustrates a non-compressed node N20 having a (logical) element table of 16 elements. In this exemplary case, the node has, in addition to twelve nil pointers, four non-nil pointers (A . . . D) pointing downward in the tree, which in this case are located in elements corresponding to element table indices 1, 7, 8 and 13. Width compression is carried out by storing only those pointers that differ from nil. In addition to the non-nil pointers, a bit pattern or chart BP1 is stored in connection with the node, on the basis of which it can be determined whether the pointer corresponding to the logical index of the element table of the node is a nil pointer or not, and if not, where the pointer corresponding to said logical index is physically located in the node. When compression is used, the fixed length element table (16 elements) of the node is represented by means of the bit pattern as a table of physical storage locations the length of which varies according to how many nil pointers the node contains in each case. It is to be noted, therefore, that in connection with width compression the logical size of the node (i.e. the size of the element table) does not change, but the physical size of the node diminishes instead, since in a compressed node the nil pointers do not occupy any storage space. As a result, a width-compressed node N30 in accordance with FIG. 3, in which all non-nil pointers are in succession, is obtained from the node of FIG. 2. The node contains only four physical elements (pointers A . . . D), and in addition a bit pattern BP1 is stored in the node, indicating the physical location of the pointer therein corresponding to the element table index formed from the search key. The bit pattern has one bit for each element (logical index) of the element table, and each bit indicates whether the corresponding element contains a non-nil pointer or a nil pointer. In the exemplary case shown in the figure, one denotes a non-nil pointer and zero denotes a nil pointer. Since the pointers are stored in the compressed node preserving the order (and no space is reserved for nil pointers), it is known for the compressed node of FIG. 3 that a nil pointer corresponds to element table index 0, a non-nil pointer corresponds to element table index 1, its physical index being zero, nil pointers correspond to element table indices 2 . . . 6, non-nil pointers correspond to element table indices 7 and 8, their physical indices being one and two, nil pointers correspond to element table indices 9 . . . 12, a non-nil pointer corresponds to element table index 13, its physical index being three, and nil pointers correspond to element table indices 14 and 15. Thus, the pointer corresponding to the logical index formed from the search key bits is found in the node.

Address computation for the compressed node is performed in such a way that a (logical) element table index is first formed from the bits extracted from the search key in the normal way. Thereafter, the bit corresponding to this index is normally read from the bit pattern. If the bit indicates that a nil pointer is concerned, the search is terminated as unsuccessful. If the bit indicates that a non-nil pointer is concerned, the physical location (physical index) of the pointer corresponding to said element table index is determined by means of the bit pattern.

Width compression of the kind described above, in which the bit pattern of the compressed node has one bit for each element (logical index) of the element table, is known per se. Such a solution is referred to for example in U.S. Pat. No. 5,276,868. As is stated in this U.S. Patent, the physical index has previously been determined from the bit pattern by two different methods. In the first method, the physical index is directly obtained by counting the number of 1-bits starting from the beginning of the bit pattern up to the bit corresponding to the element table index. In the second method, the bit pattern is combined with a four-bit search character and this code is used as an index of an existing search table. The drawback of the former method is its slowness, since the search of the physical index can require as many as 16 discrete calculating operations. The drawback of the latter method, on the other hand, is the high storage space consumption. The U.S. Patent referred to discloses a method whose aim is to provide a rapid conversion from a logical index to a physical index. This system supports only two node sizes: quad nodes and nodes of size 16. In the method, some of the nil pointers are removed from the nodes in such a way that nodes having less than five non-nil pointers are converted to compressed nodes, whereas the remaining nodes are maintained uncompressed. The structure thus includes both compressed nodes and non-compressed nodes of size 16. The compressed nodes can be of fifteen different types according to the logical indices of the pointers. Dedicated conversion means wherewith the physical index is found are associated with each of said types. The drawback of the structure is, among other things, the fact that it only supports two node sizes and the fact that a large number of nil pointers must still be stored in the structure. On account of this, the structure does not provide a very good result in view of storage space requirement and copying costs. Also, since only two node sizes are possible, the structure is not well suited to functional memories or other memories having efficient memory management that is capable of allocating memory for use a single word at a time.

SUMMARY OF THE INVENTION

It is an object of the present invention to offer an improvement to the problem described above by providing a method ensuring rapid conversion from a logical index to a physical index and furthermore enabling width compression of all nodes. This object is achieved with the method defined in the independent claims.

The invention makes use of a bit pattern of the kind described above, in which the number of 1-bits (or zero bits, wherein a non-nil pointer is indicated by zero bits) from the beginning of the bit pattern up to the bit corresponding to the element table index indicates the physical index. The idea is to divide the calculation of 1-bits in the bit pattern into parts, preferably two parts, which will allow a very small search table to be used. The calculation is divided into parts by setting all those bits in the bit pattern to zero whose index in the bit pattern is greater than the logical index formed from the search key, and by reading the number of ones in the bit pattern in one or more steps from the search table, in which numbers of 1-bits in all different bit combinations of a word whose total number of bits is a predetermined portion of the number of bits in said bit pattern have been calculated in advance. The length of said word is preferably half of the length of the bit pattern (16), in which case the table retrieval is performed once if the logical index (starting from zero) is smaller than the length of the word, or twice if the logical index is greater than this.

The search table necessary in the solution in accordance with the invention is in practice so small that it can be located in the cache of the processor, which will afford a rapid search.

Besides enabling a rapid conversion, the solution in accordance with the invention supports width-compressed nodes of all sizes, thus allowing all nodes in the structure to be width-compressed. The same rapid conversion method can be used for all nodes. Furthermore, the solution is suitable for both conventional overwriting structures and functional structures.

BRIEF DESCRIPTION OF THE DRAWINGS

In the following the invention and its preferred embodiments will be described in closer detail with reference to examples in accordance with FIGS. 4–11 in the accompanying drawings, in which FIG. 5 shows the bit pattern of a width-compressed node, FIG. 6 illustrates masking of the bit pattern of FIG. 5 for determining the physical index, FIG. 7 shows a 256-element search table used for the conversion, FIGS. 9 and 10 illustrate masking of the bit pattern of another width-compressed node for determining the physical index.

DETAILED DESCRIPTION OF THE INVENTION

When width compression is used on the nodes of a trie structure, it can be effectively utilized by selecting a large node size for the structure. Thus, in the structure in accordance with the invention the starting-point is a node size distinctly larger than quads, preferably nodes of (logical) size 16.

In addition to the type information of the node, each node must contain only an element table (pointers) and a bit pattern.

Figure 1:
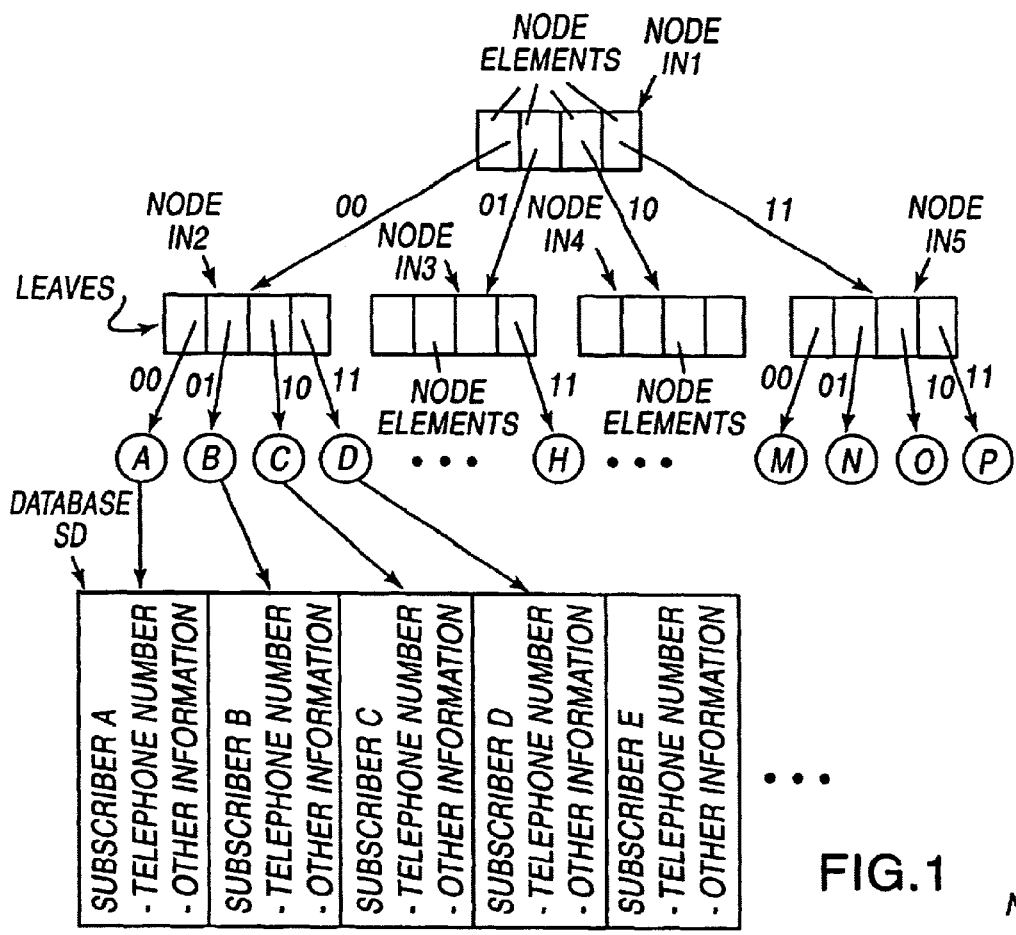
FIG. 1 illustrates the use of a unidimensional digital trie structure in the maintenance of subscriber data in a telephone exchange.
Figure 2:
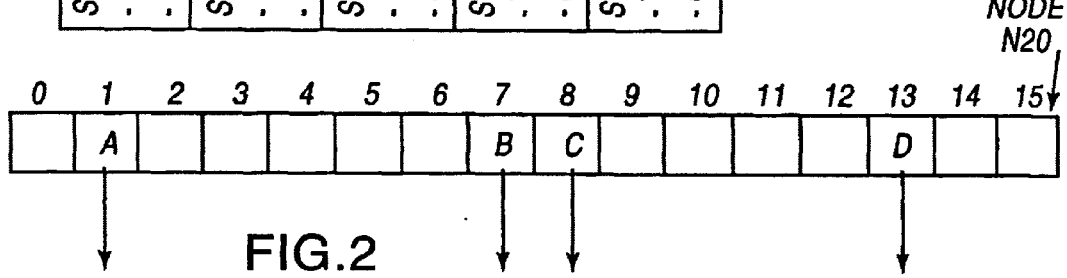
FIG. 2 shows a node having 16 elements, having four non-nil pointers.
Figure 3:
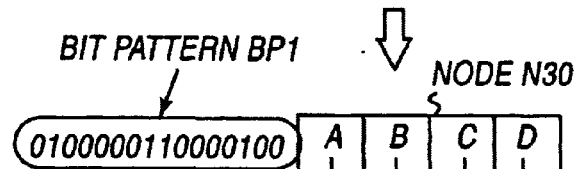
FIG. 3 shows the node of FIG. 2 width-compressed.
Figure 4:
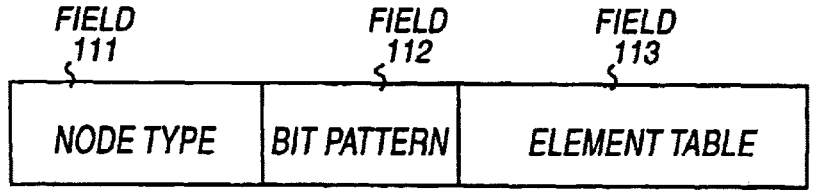
FIG. 4 illustrates the structure of a width-compressed node.

FIG. 4 illustrates the structure of a width-compressed node. In its minimum composition, the compressed node thus comprises three parts: a type information field indicating the type of the node (reference 111), field 112 containing a bit pattern, and an element table (reference 113) in which the number of elements (pointers) is in accordance with the above. The type information can e.g. be used to indicate whether the node is an internal node or a leaf node in the tree. The bit pattern and the node type information can in practice be accommodated in the same word, and thus the bit pattern requires no extra space.

Figures 5, 6, 7, 9, 10:
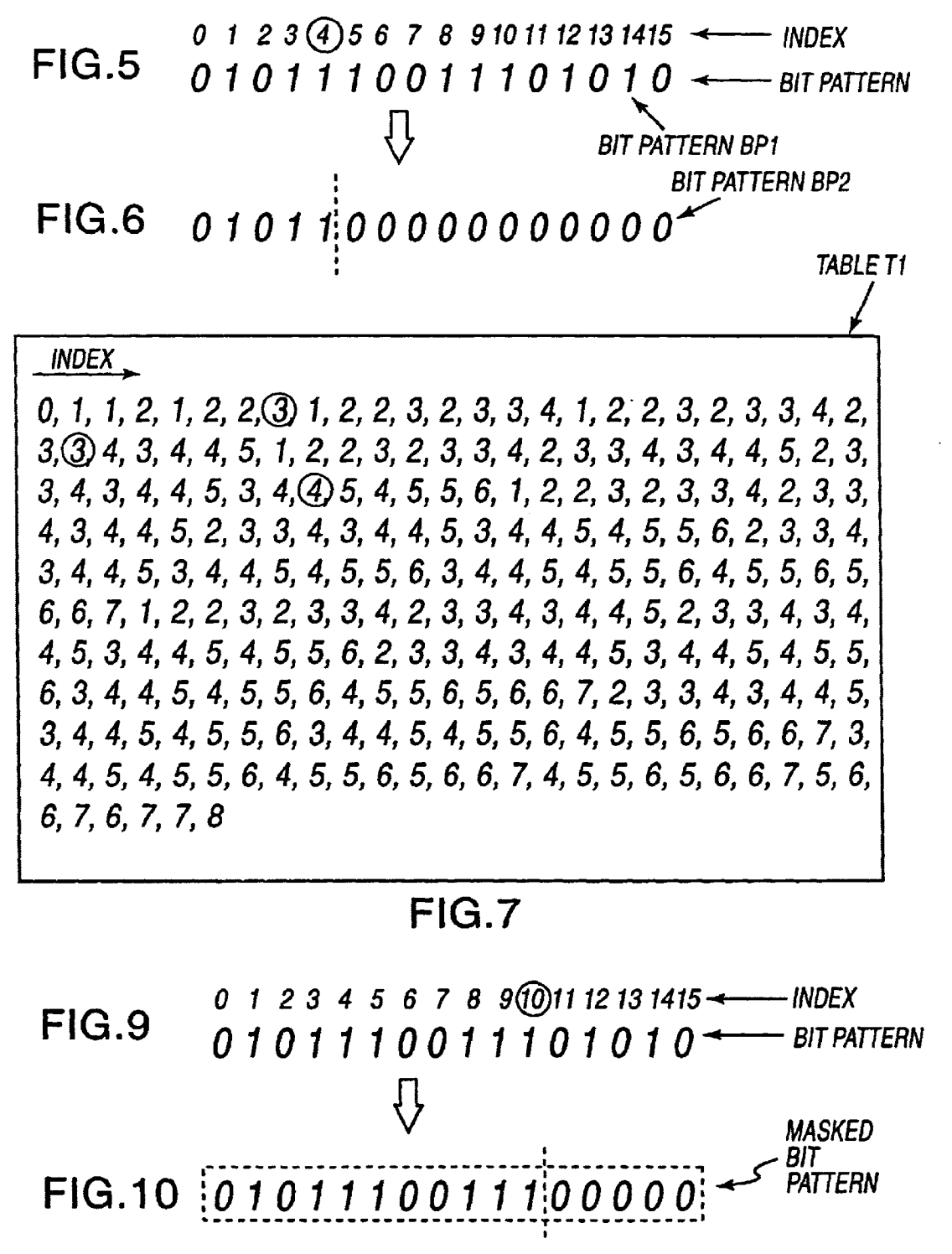

FIGS. 5 and 6 illustrate the conversion of a logical index to a physical index in accordance with the invention. FIG. 5 shows the bit pattern BP1 of a width-compressed node, and it is presumed in the example that the logical index obtained from the search key is four (index circled). To initiate the conversion, the bit pattern is read into the register. Thereafter, the bit pattern is masked, which in this connection means that all bits having an index greater than the logical index concerned are set to be zero (the bits to the right of the bit corresponding to the index). This yields the masked bit pattern BP2 in accordance with FIG. 6.

A table T1 in accordance with FIG. 7, containing 256 elements, has been stored in the memory in advance. The numbers of 1-bits for all bit combinations of an eight-bit word have been calculated in advance in the table. The table index travels from left to right and from the top down in the table.

The remaining bits in bit pattern BP2 yield an integer serving as an index of table T1 when said bits are interpreted in such a way that the leftmost bit is the least significant bit. (Even though binary numbers are more typically represented so that the least significant bit is the rightmost bit.) In the exemplary case shown in the figure, the index obtained will thus be 26 ($01011=2^1+2^3+2^4=26$). The element corresponding to index 26 is read from table T1, said element being 3 (circled in the table). As will be seen from FIG. 5, the number of 1-bits up to the logical index is three.

Figure 8:
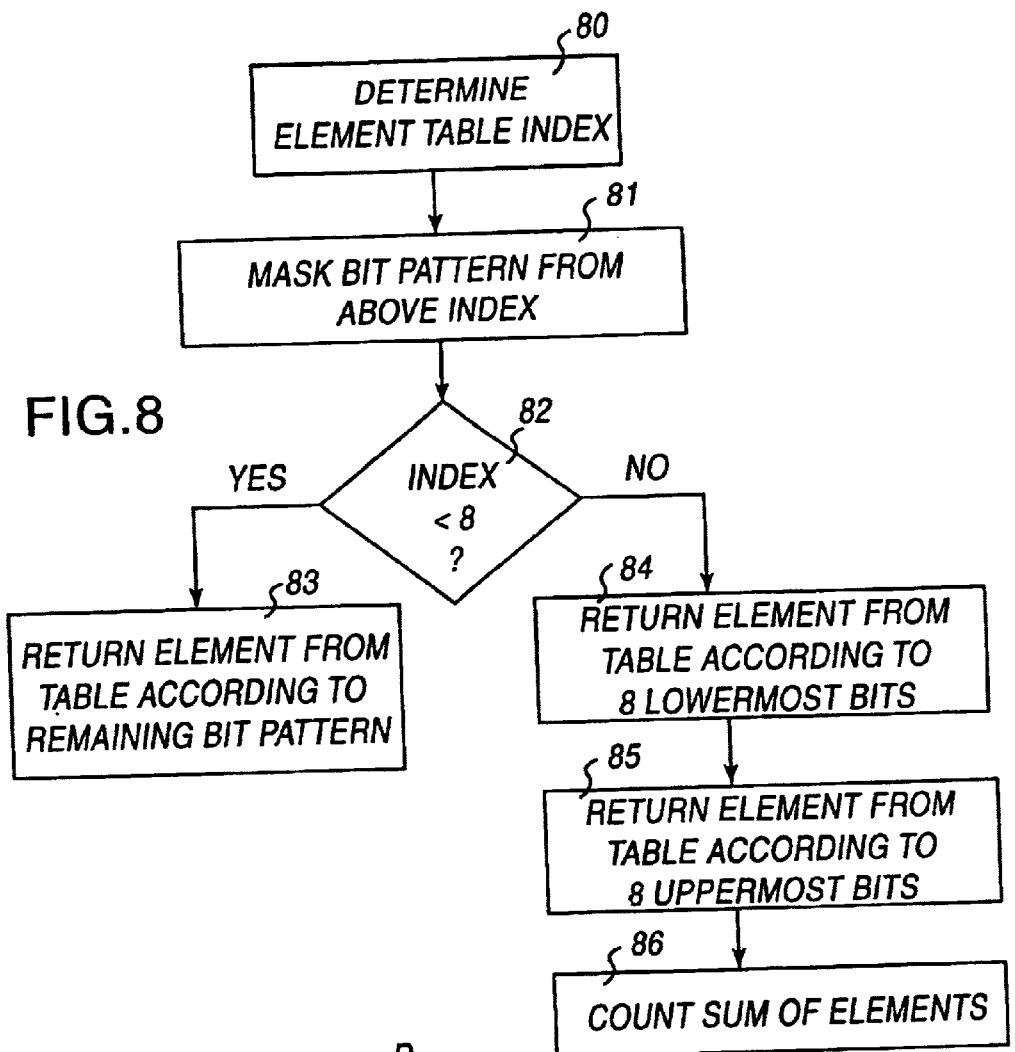
FIG. 8 is a flow chart showing the conversion of the logical index to a physical index.

FIG. 8 is a flow chart illustrating the conversion in accordance with the invention. When the element table index (logical index) has been determined (step 80), the bit pattern is masked from above the index (step 81). Thereafter, it is tested in step 82 whether the index is smaller than eight. If this is the case, the procedure is as described above, i.e., the element that is obtained directly by means of the index formed from the remaining bit pattern is returned from table T1. If, on the other hand, the index is at least eight, the table is read twice. At the first round, the element corresponding to the index formed from the eight lowermost bits is read (step 84), and at the second round the element corresponding to the index formed from the eight uppermost bits (step 85). The elements thus obtained are added together (step 86).

FIGS. 9 and 10 illustrate the conversion of the logical index to a physical index in a case where the logical index is greater than eight (ten). The bit pattern is the same as in FIG. 5. Since the logical index is ten in this case, all bits for which the corresponding index is greater than this are now masked. This will give the masked bit pattern in accordance with FIG. 10. Since the comparison in step 82 shows that the index is not smaller than eight, the element corresponding to the index formed from the eight lowermost bits is first returned from the table (step 84). The index obtained in this case is 58 ($01011100=2^1+2^3+2^4+2^5=58$), and thus the table yields the value 4 (circled).

The eight uppermost bits in this case yield the index 7 ($11100000=2^0+2^1+2^2=7$), and thus the table yields the value 3. When the elements are added together, the value 7 is obtained, which corresponds to the number of 1-bits in the bit pattern way up to the logical index.

As was already indicated at the beginning, the principle described above pertains both to functional and to non-functional (imperative) structures.

The solution is also suitable for bucketless and bucket trie structures. However, width compression is to greater advantage in a bucketless structure, since the buckets can be used to combine nodes at the lower end of the trie tree, where the number of empty elements is greater than at the top of the trie.

A unidimensional search structure can be made multidimensional (generally n-dimensional) in the known manner by employing bit interleaving. Bit interleaving has been disclosed for example in the above international application PCT/FI98/00191, wherefrom the interested reader can find background information relating to the invention, if desired.

Figure 11:
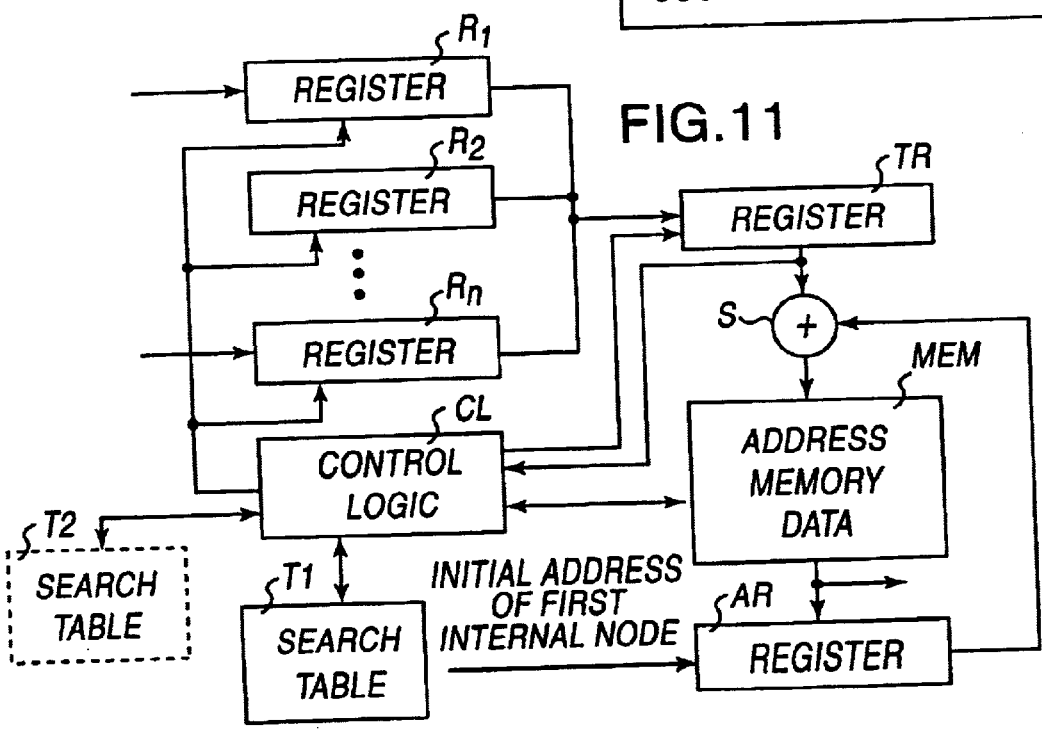
FIG. 11 shows a memory arrangement in accordance with the invention on block diagram level.

FIG. 11 shows a memory in accordance with the invention on block diagram level. Each dimension has a dedicated input register, and hence there is a total of n input registers. The search key of each dimension is stored in these input registers, denoted by references $R_1 \ldots R_n$, each key in a register of its own. The input registers are connected to a register TR in which the above-described search word is formed in accordance with the bit interleaving method employed. The register TR is connected via adder S to the address input of memory MEM. The output of the memory in turn is connected to address register AR the output of which in turn is connected to adder S. Initially the bits selected from each register are read into the common register TR in the correct order. The initial address of the first internal or trie node is first stored in the address register AR, and the address obtained as an offset address from register TR is added to the initial address in adder S. The resulting address is supplied to the address input of the memory MEM, and the data output of the memory provides the initial address of the next node, the address being written into the address register AR over the previous address stored therein. Thereafter the next selected bits are again loaded from the input registers into the common register TR in the correct order, and the address (index) obtained thereby is added to the initial address of the relevant table (i.e., trie node), obtained from the address register AR. This address is again supplied to the address input of the memory MEM, the data output of the memory thus providing the initial address of the next node. The above-described procedure is repeated until the desired point has been accessed and recordal can be performed or the desired record read.

Control logic CL reads the element table index from the register TR and the corresponding bit from the bit pattern of the node. If said bit indicates that a non-nil pointer is concerned, the control logic determines, using table T1, the physical index on the basis of the bit pattern and stores it in register TR instead of the logical index. In such a case, the physical index is added (instead of the logical index) in adder S with the initial address of the node that is obtained from register AR. The control logic also attends to the compression of the nodes and to the fact that a correct number of bits (2 or 4) is extracted from the registers in each node.

The rapidity of the address computation can be influenced by the type of hardware configuration chosen. Since progress is by way of the above-stated bit manipulations, address computation can be accelerated by shifting from use of one processor to a multiprocessor environment in which parallel processing is carried out. An alternative implementation to the multiprocessor environment is an ASIC circuit.

The structure in accordance with the invention is preferably implemented in such a manner that also the nodes (leaves) at the lowermost level are compressed similarly as the other nodes (internal nodes). If a pointer is stored in a leaf, the structure is the same as in the internal nodes. If data units are stored in the leaves, these can be of fixed length in order that also the leaves can be compressed similarly as the internal nodes. However, it is possible that the nodes at the lowermost level are not similarly width-compressed. In that case, however, some of the advantages of the invention are lost, since in that case the search is slower at the leaves.

The method described above can also be implemented in such a way that it is not checked in advance whether the bit corresponding to the logical index is zero or not, but the physical index can be retrieved without performing said check. In such a case, it is preferable to proceed in such a way that table T2 (FIG. 11) is used; the table is otherwise similar to table T1 in FIG. 7, but the value of the first element (index zero) is one instead of zero. If the value of said element were zero, the physical index returned might be zero in the case of a nil pointer corresponding to a logical index, which would correspond to the first word in the node, containing the bit pattern and the type information. To eliminate such an error situation, it is preferable to store 1 as the value of the first element, which, it is true, will provide an incorrect path. However, this incorrect path is detected at once when a key comparison is performed in the leaf at the end of said path, and the search will terminate as unsuccessful. Thus, in the case of a nil pointer an "incorrect" path will always be obtained, since the search should terminate when a nil pointer is hit. In this case, however, the search will proceed up to the leaf, where the search will terminate as unsuccessful. However, when table T2 is used, this incorrect path is always safe in the sense that the search will not skip the table (jump off from the search tree).

An alternative procedure is to use the table of FIG. 7 only, but to check whether the result obtained is zero. If this is the case, for example the value one is returned instead of zero or the search is terminated as unsuccessful.

The procedure can also be one using both tables in such a way that table T2 is used in the YES branch and table T1 in the NO branch of FIG. 8, in which case it is checked in the NO branch whether the result is zero and if this is the case, the value one is returned.

Even though the invention has been described in the above with reference to examples in accordance with the accompanying drawings, it is obvious that the invention is not to be so restricted, but it can be modified within the scope of the inventive idea disclosed in the appended claims. It is in principle also possible to employ a table (T1/T2) having e.g. only $2^4=16$ elements, and thus in the case of a 16-bit bit pattern one to four table retrievals must be performed. However, this solution is not as advantageous, since also the number of comparisons (step 82) will increase in addition to that of searches. There may also be more than one table in such a way that the table values have been calculated for words of different lengths. The conversion in accordance with the invention can also be applied to nodes having a logical size greater than 16, e.g. 32 or 64. The meanings of zero and 1-bits can be exchanged so that zero bits indicate non-nil pointers.

What is claimed is:

1. A method for implementing a memory, in which memory data is stored as data units for each of which a dedicated storage space is assigned in the memory, the method comprising:

using a directory structure comprising:
a tree-shaped hierarchy having nodes at several different levels, at least some of the nodes are associated with a logical element table, the individual element may contain a pointer pointing to a lower node in the tree-shaped hierarchy, or may be empty, in which case the content of the element corresponds to a nil pointer, the number of elements in the table corresponding to a power of two;
computing an address in the directory structure, the computation comprising:
selecting a given number of bits from a bit string formed by search keys;
forming from selected bits a search word with which an address of a next node is sought in the node, and proceeding to the next node;
selecting a predetermined number of bits from unselected bits in the bit string formed by the search keys employed, and forming from the predetermined number of bits a search word with which the address of a further new node at a lower level is sought in the next node that has been accessed; and
repeating selection of the predetermined number of bits until an element containing a nil pointer is encountered or until a node at the lowest level is accessed;
employing width-compressed nodes in which non-nil pointers are physically stored and additionally a bit pattern which has one bit for each element and wherein a given value of an individual bit indicates that the content of the element corresponds to a pointer pointing downward in the directory structure and a complement value of the given value indicates that the content of the element corresponds to a nil pointer;
determining a physical storage location in a node corresponding to the element table index associated with the search word on the basis of the bit pattern, the determination of the physical storage location comprising:
storing at least one search table in which numbers of bits having the given value are stored in different combinations of a word whose total number of bits is a predetermined portion of the total number of bits in the bit pattern;
setting all bits in the bit pattern corresponding to an index that is greater than an element table index to indicate a nil pointer; and
performing a certain number of reading operations from at least one search table in accordance with a value of the element table index as compared to the total number of bits in the word, the numbers obtained being added together when there are more than one reading operations.

2. The method according to claim 1, wherein the length of the bit pattern is sixteen bits, the number of bits in the word is eight and the search table is read once when the logical index is smaller than eight and read twice when the logical index is greater than eight.

3. The method according to claim 1, wherein only one search table is employed in which the numbers of the bits are stored in all different combinations of the word.

4. The method according to claim 3, further comprising checking whether the value obtained from the table is zero.

5. The method according to claim 1, wherein another search table is employed in which the numbers of the bits are stored in all other combinations of the word, but in the case of a combination in which the number of the bits is zero, an incorrect value is stored in the table.

6. The method according to claim 2, wherein two search tables are employed, the first table storing the numbers of the bits in all different combinations of the word and the second table storing the numbers of the bits in all other combinations of the word, but in the case of a combination in which the number of the bits is zero, an incorrect value is stored in the table, wherein the second table is read when reading is performed once and the first table is read when reading is performed twice.

7. The method according to claim 1, wherein the width-compressed nodes are made from substantially all nodes in the structure.

8. A memory arrangement for storing data units, the memory arrangement comprising:

a directory structure using search words formed from a bit string constituted by search keys, the directory structure comprising:
a tree-shaped hierarchy having nodes at several different hierarchy levels, at least some of the nodes are associated with a logical table wherein an individual element may contain a pointer pointing to a lower node in the tree-shaped hierarchy or may be empty, in which case the content of the element corresponds to a nil pointer, the number of elements in the table corresponding to a power of two, the directory structure employs width-compressed nodes in which non-nil pointers are physically stored and additionally a bit pattern which has one bit for each element, a given value of an individual bit indicates that the content of the element corresponds to a pointer pointing downward in the directory structure and a complement value of the given value indicates that the content of the element corresponds to a nil pointer, the memory arrangement further comprises:
means for determining the physical storage location in the node, corresponding to an element table index associated with the search word, on the basis of the bit pattern;
at least one search table in which numbers of bits having the given value are stored in different combinations of a word whose total number of bits is a predetermined portion of the number of bits in the bit pattern;
conversion means for setting all bits of the bit pattern that correspond to an index greater than an element table index to a value indicating a nil pointer;
retrieval means for performing a reading operation from at least one search table a given number of times in accordance with the value of the element table index as compared to a total number of bits in the word; and
adder means for adding together the numbers obtained from the search table in response to a reading operation performed more than once.

* * * * *